(12) United States Patent
Corley

(10) Patent No.: US 7,782,360 B2
(45) Date of Patent: Aug. 24, 2010

(54) STORABLE TEST PATTERN IMAGE AND METHOD

(76) Inventor: Ferrand D E Corley, 8885 Nashua Drive, Mississauga, Ontario (CA) L4V 1R1

( * ) Notice: Subject to any disclaimer, the term of this patent is extended or adjusted under 35 U.S.C. 154(b) by 1001 days.

(21) Appl. No.: 11/527,678

(22) Filed: Sep. 27, 2006

(65) Prior Publication Data

US 2007/0165110 A1     Jul. 19, 2007

Related U.S. Application Data

(60) Provisional application No. 60/721,541, filed on Sep. 29, 2005.

(51) Int. Cl.
*H04N 17/00* (2006.01)
*H04N 5/225* (2006.01)

(52) U.S. Cl. .................................. 348/188; 348/373

(58) Field of Classification Search .......... 348/187–188
See application file for complete search history.

(56) References Cited

U.S. PATENT DOCUMENTS 4,779,136 A * 10/1988 Corley ........................ 348/188
4,991,007 A * 2/1991 Corley ........................ 348/188
5,572,444 A * 11/1996 Lentz et al. .................. 702/117
5,959,726 A * 9/1999 Riley et al. ................ 356/124.5
2008/0192120 A1* 8/2008 Corley ........................ 348/188

* cited by examiner

*Primary Examiner*—Ngoc-Yen T Vu

(57) ABSTRACT

A portable, self contained, deployable test pattern display, for use in optimising imaging quality having a portable protective display housing, a test pattern incorporating imaging information contained in and deployable from the housing, a retraction device connected to the test pattern for replacing it within the housing, so that the test pattern can be carried to a desired location, protected by the housing, and the test pattern can be deployed from the housing when required, and can then be replaced within the housing. Also disclosed is a method of optimizing image quality, of a scene image recorded at a location by comparing the values of a test pattern image taken at the location, with predetermined values of the test pattern, by, recording a scene image, recording an image of a test pattern comparing values of the test pattern image, with predetermined values of the test pattern, adjusting values of the test pattern image to the predetermined values, and adjusting the values of the scene image to match the adjustments made to the test pattern image.

13 Claims, 6 Drawing Sheets

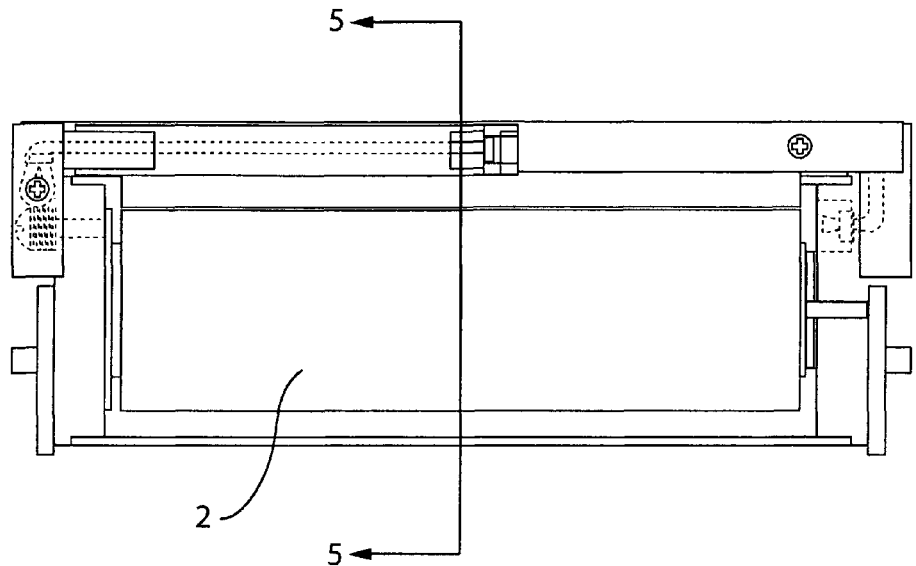
FIG. 2
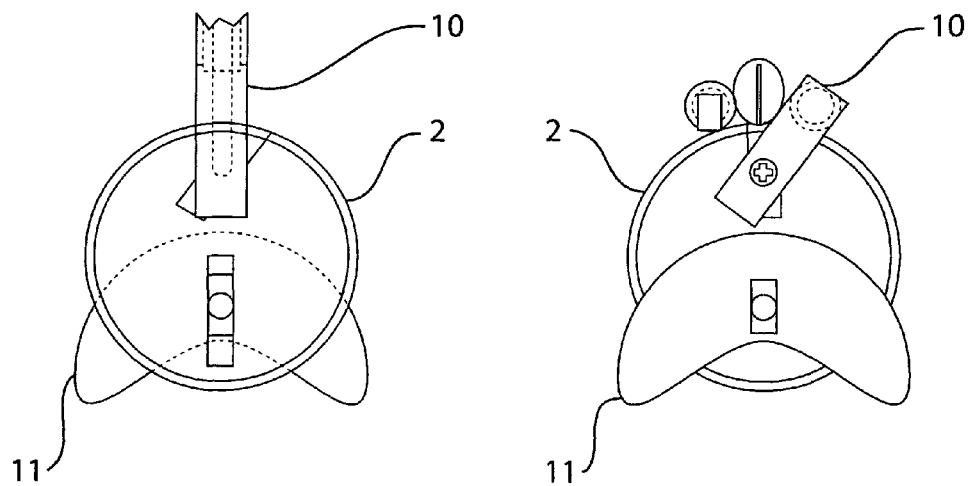
FIG. 3  FIG. 4

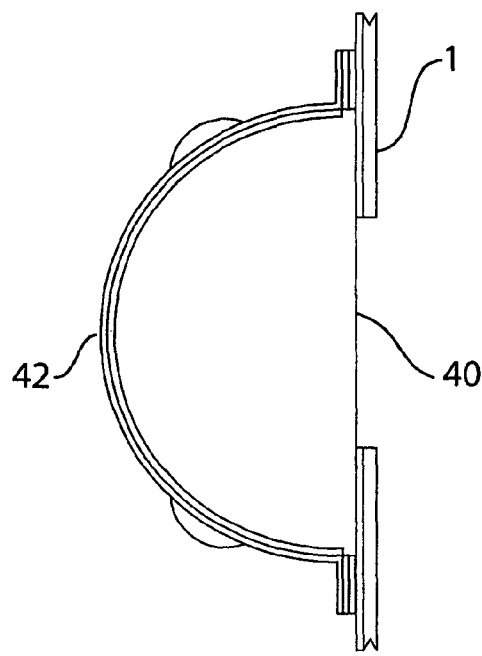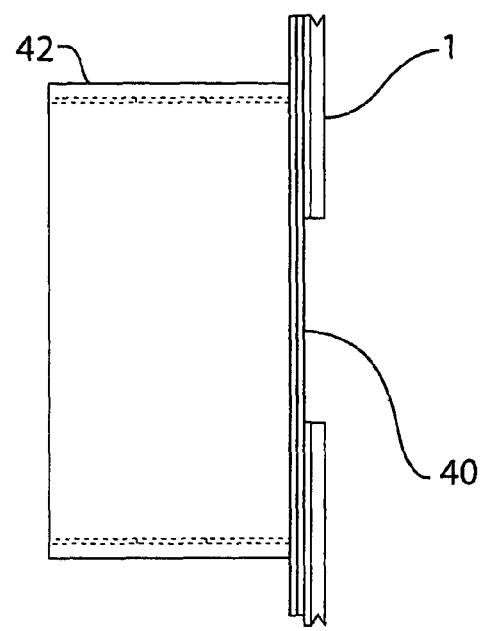
FIG. 11   FIG. 12
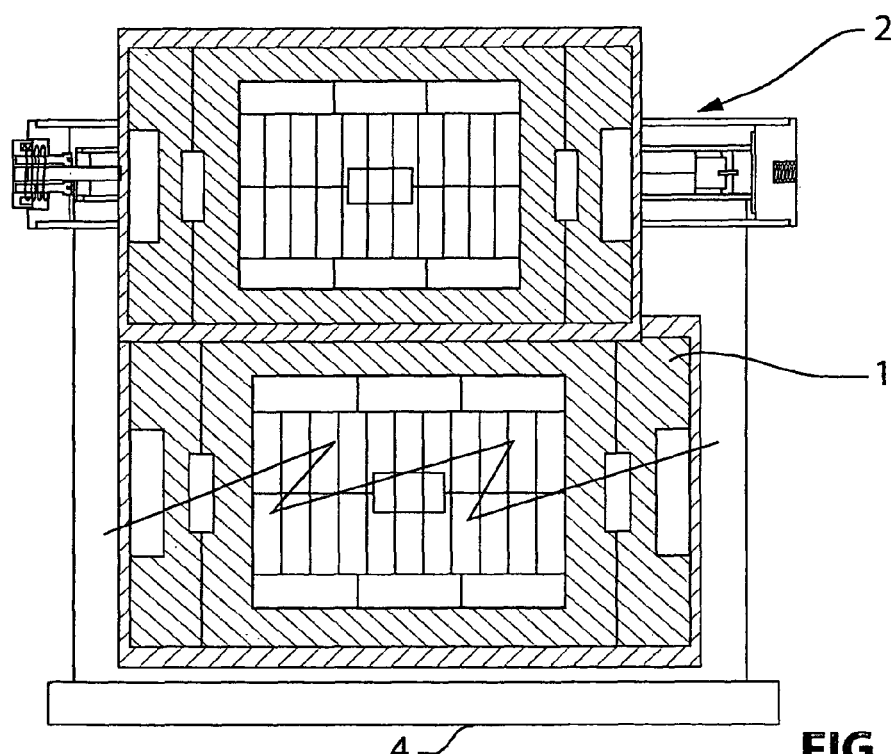
FIG. 13

STORABLE TEST PATTERN IMAGE AND METHOD

This application is based on U.S. Provisional Application Ser. No. 60/721,541 filed Sep. 29 2005

FIELD OF THE INVENTION

The invention relates to test patterns used in qualitative evaluation of video and adjustment of/or digital camera images. The invention is applicable both in the evaluation and/or modification of electronic image signals being generated, for example, by a video camera, and also, in subsequent evaluation, control and manipulation of images previously recorded by a camera.

BACKGROUND OF THE INVENTION

For optimum reproduction imaging devices such as digital, still, video and other electronic cameras require either, that the camera be aligned before taking an image or picture of a scene or person, or that the image of an accurate test pattern be recorded before or during recording of the scene or person, thus enabling data from the recorded test pattern to be used in improving image quality when displaying and/or re-recording image of the scene or person.

Test pattern elements may be various different shapes, geometrical or random. The test patterns may include colours, grayscale and resolution information.

Test pattern elements should be accurate, consistent and product electronic signals that are easily interpreted using standard industry equipment. For example the six primary colours of the test pattern, Red, Green, Blue, Cyan, Magenta and Yellow, are designed to fall at RGB level combinations which are preferably in the region of 560 and 280 mV (80 and 40 IRE units), plus or minus 5 mV. For example, the Red patch should preferably produce 560 mV (80 IRE) for the Red channel and 280 mV (40 IRE) each for the Blue and Green, similarly the yellow patch should preferably produce 560 mV (80 IRE) for the Red and Green channels and preferably 280 mV (40 IRE) for the Blue. Other colours reproduce preferably at their similar respective levels.

Test patterns are required to be meticulously cared for. Typical cardboard matte patterns degrade rapidly in use, from handling, fingerprints and fading. The use of degraded patterns results in inferior image quality due to camera misalignment from the use of inaccurate data generated by the faded or otherwise damaged patterns.

BRIEF SUMMARY OF THE INVENTION

With a view to overcoming these problems, the invention provides one or more precision test patterns self contained and stored in a clean environment from whence they can be readily displayed for use. The invention provides for efficient, clean, storage and display of a test pattern or image, preferably in a portable device or container, so that is ready and available for use at a shooting location. After a camera has been aligned, prior to shooting, or the test pattern image has been recorded, during shooting, the test pattern maybe retracted into its clean storage environment, in its container.

The invention also provides a method of enhancing a recorded image, by taking an image of a test pattern, at, during, or after, taking images of a scene, and thereafter comparing electronic values from the test pattern image taken at the scene with aim values provided with the test pattern and adjusting the scene images to optimise their qualities, using correction values required to adjust the test pattern image to match the test pattern's aim values.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

FIG. 2 is a front elevational view of the same test pattern(s), shown retracted into its storage housing;

FIG. 3 is an end elevation of FIG. 2 at an intermediate stage;

FIG. 4 is an end elevation of FIG. 2 at a further stage;

FIG. 11 is a schematic side elevation partly in section showing an optional feature;

FIG. 12 is a top plan view of the embodiment of FIG. 11; and,

FIG. 13 is a front elevational view partly cut away of an alternate form of the FIG. 1 embodiment.

DESCRIPTION OF A SPECIFIC EMBODIMENT

Figure 1:
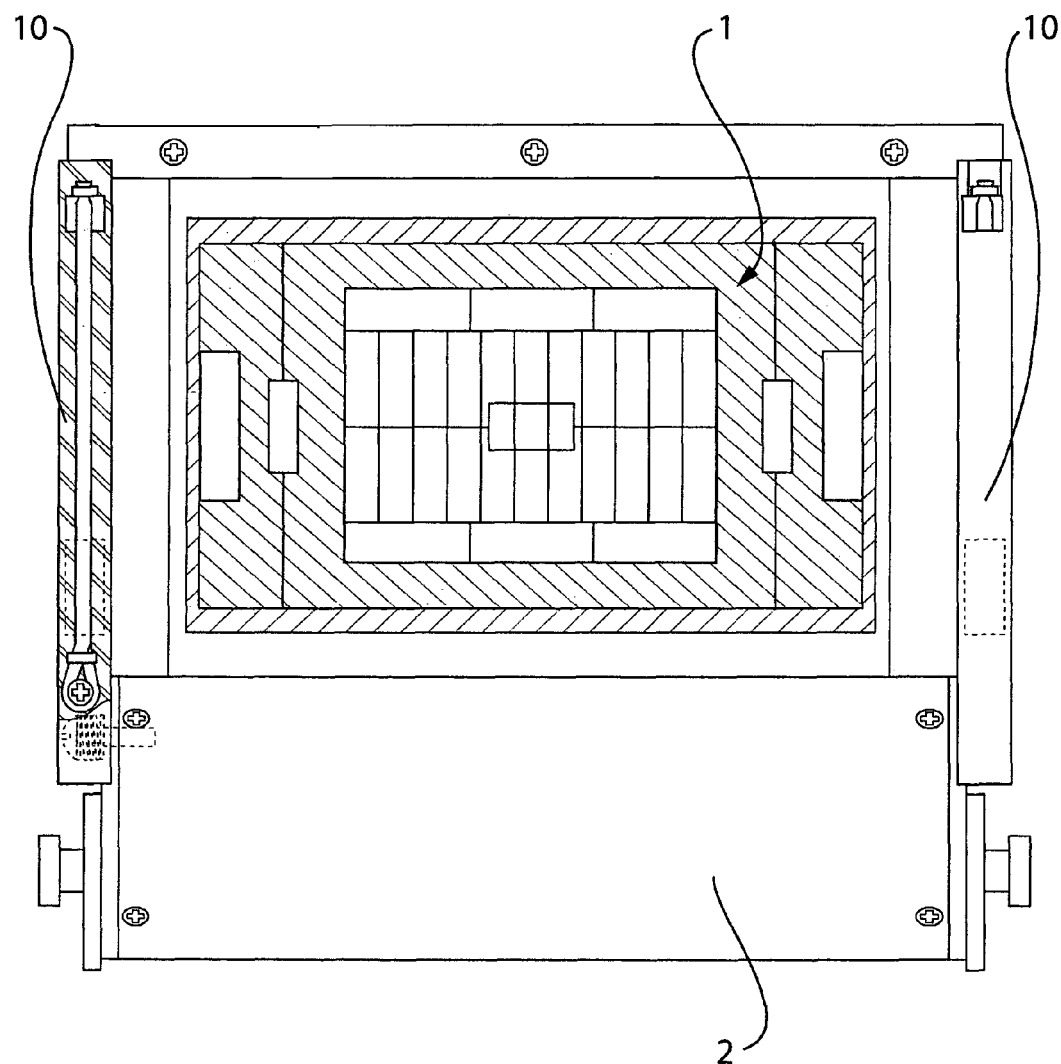
FIG. 1 is a front elevational view of a test pattern(s) illustrating the invention, shown extended from its storage housing container.

It will be understood that the invention is applicable to a variety of test patterns used in many applications of image reproduction.

The test patterns may be various different shapes, geometrical or random. The test patterns may include colours, grayscale and resolution information.

In a test pattern used in evaluating colour and tonal reproduction, it is desirable to include precision colour and grayscale information. It is convenient to include six primary colours that produce electronic signals that may be readily evaluated using standard industry equipment. For example the test pattern could include Red, Green, Blue, Cyan, Magenta and Yellow Patches that are designed to fall at RGB level combinations which are preferably in the region of 560 and 280 mV (80 and 40 IRE units), plus or minus 5 mV. The Red patch should preferably produce 560 mV (80 IRE) for the Red channel and preferably 280 mV (40 IRE) each for the Blue and Green, similarly the yellow patch should preferably produce 560 mV (80 IRE) for the Red and Green channels and preferably 280 mV (40 IRE) for the Blue. Other colours should preferably reproduce at their similar respective levels.

The preferred instrument for measuring R, G, B voltage levels is a waveform monitor capable of displaying the three channels side-by-side simultaneously. However, the Red, Green and Blue data from inexpensive cameras is encoded into a single signal, consequently individual R, G, B signals are not available. Colour information from such cameras is typically reproduced on a vectorscope, which draws the hue component of a colour as a vector signal and the saturation of that colour as the distance from the center of the vectorscope display.

It should be noted that because a vectorscope fails to show the brightness level of a colour, many different levels of a colour can reproduce at the same position, or spot in a vectorscope display. Despite this restriction, vectorscopes are widely used in evaluating colour images.

Grayscale neutrality in a test pattern is important because deviation from neutral, in all or part of a grayscale, will result in images from a camera aligned to such a pattern producing images having a hue complementary to that of the test pattern. For this reason every step of the pattern's grayscale is individually colour corrected, by adding minute quantities of color, so that each grayscale step is spectrophotometrically neutral, plus or minus 3 mV between R, G, B channels.

In these patterns the various areas of the patterns are in shades of gray, and such patterns are well known in the art. The test patterns may also have portions relating to skin tones, resolution and to dimensions, and these may be of particular application in security work, described below.

The drawings show various different embodiments which are described generally in the following paragraphs.

Generally, in this invention, a portable protective housing contains the test pattern(s). Generally, one end of the pattern is attached to some kind of retrieval device for retracting the test pattern back into the housing. One such device could be a spring loaded roller within the housing. The other end of the pattern would be attached to a rod member external to the housing, enabling the pattern to be withdrawn from the housing for the brief time it is in use. On release, the pattern retracts back into its housing.

In other cases, the housing can be held horizontally, suspended from a rod on the outer end of the test pattern. By simply pulling down on the housing the test pattern can be extended and deployed. The weight of the housing may be enough to hold the test pattern extended and deployed, while the image is recorded. Afterwards the test pattern can be replaced in the housing by simply lifting housing to meet the rod.

In still other cases the retrieval mechanism may be similar to a roller blind. Such mechanism contains its own internal lock. The lock could then be released for retrieval by simply pulling on the test pattern.

Another retrieval system which could be used is a manual rewind similar to a tape roll used by surveyors, which has a simple exterior rewind handle for rolling the tape back into its housing. A motorised drive can also be provided.

There are thus a wide variety of retrieval systems available, some of great simplicity and others more complex. The invention is not deemed to be restricted to any one such system.

In one embodiment of this invention, (FIGS. 1, 2 and 5) the housing containing the test pattern has one end of the pattern attached to a spring loaded roller within the housing, the other end of the pattern is attached to a rod member external to the housing. Side members are attached to the housing, side members may be in a single length, or folding, using elastic shock cords or other well established mechanisms to extend the length, thus enabling the rod member, attached to the end of the pattern, to be hooked or clipped on to the side members when extended, thus holding the pattern at the correct distance from the housing to enable accurate framing of the pattern by a camera. A camera may now be aligned using the exposed test pattern. Alternatively the test pattern image may be recorded for later reference adjustment of the recorded image characteristics. Releasing the rod member from the uprights enables the pattern to retract into its housing where it remains until next required.

Adjustable feet members (FIGS. 3 & 4) enable the housing, and thus the pattern, to be tilted laterally to provide sideways level adjustment of the test pattern, also forwards and backwards to reduce reflection or flare from the pattern surface.

In another embodiment, dual housings (FIG. 6) enable patterns to be rolled from one housing to the other; in this embodiment support members are attached to the housings for stability and to preset the correct distance for the pattern format being used, i.e. 4:3, 16:9 etc.

In another embodiment, chart angle adjusting members (FIGS. 7 and 8) attach to support members, enabling a spectrophotometrically neutral section of the flexible pattern to be pushed forward so that the center section remains at 90° normal to the camera while the two sides of the flexible chart are adjusted to 45° and 135° respectively. This adjustment to the shape of the chart enables the lighting contrast ratio from the three surfaces of the chart to be readily measured by monitoring instrumentation attached to a camera. By providing a direct readout of a scene's illumination contrast ratio, the invention is more accurate and can save lighting directors time over the present system of using a light meter to establish the relationship between the key (main light) and fill lighting.

Similar benefits are achieved by providing a folding member (FIGS. 9 and 10), the front of which is covered with a spectrophotometrically neutral reflective surface, wherein the folding member may be opened and locked to provide three flat reference surfaces at 45°, 90° and 135°, relative to the camera. The folding member can be used free standing or attached to the frame members in embodiment using clips or other devices such as snap fasteners or Velcro (trade mark).

In another embodiment, FIGS. 11 and 12, an aperture is provided in the pattern enabling a flexible black member to be clipped or attached behind the aperture to provide a super black three dimensional camera reference, representative of the lowest reflected light level found in a typical scene.

In another embodiment of this invention, the housing containing the test pattern(s) is held horizontally (FIG. 13) the image being withdrawn from the housing vertically and locked when desired. This allows a camera operator to use the device single handedly, by supporting the housing using a threaded attachment or by placing the housing on a flat surface, and letting the pattern(s) hang from the housing ready for use. Similarly, the pattern retracts back within its housing on release of the locking device.

In another embodiment, an LCD or other text display may be provided on or within the housing on which an operator may input information about, for example, the name of a production, scene and take number or any other pertinent data such as date, time, venue and/or sound synchronization pulse.

FIG. 1 shows a frontal view of a generic embodiment with the pattern 1 raised from the housing 2 and the support members 10 upright.

FIG. 2 shows a frontal view with the pattern lowered and wound on the spring loaded pattern winding drum, within the housing.

FIGS. 3 and 4 show end views with feet 11 adjustable to tilt. In the mechanism one end of a spring 8 is attached to the free turning hub, the hub is further attached to the pattern winding drum. The other end of spring is attached to a housing end member which serves as a bearing for the free floating end of the pattern winding drum.

FIG. 4 shows the device with both adjusting feet 11. A single locking stud, allows adjustment sideways and forwards/backwards, enabling common main supporting end members to be used on both ends of the device. A T bolt slides within a slotted main supporting end member providing tilting both sideways and forward/backwards.

Figure 5:
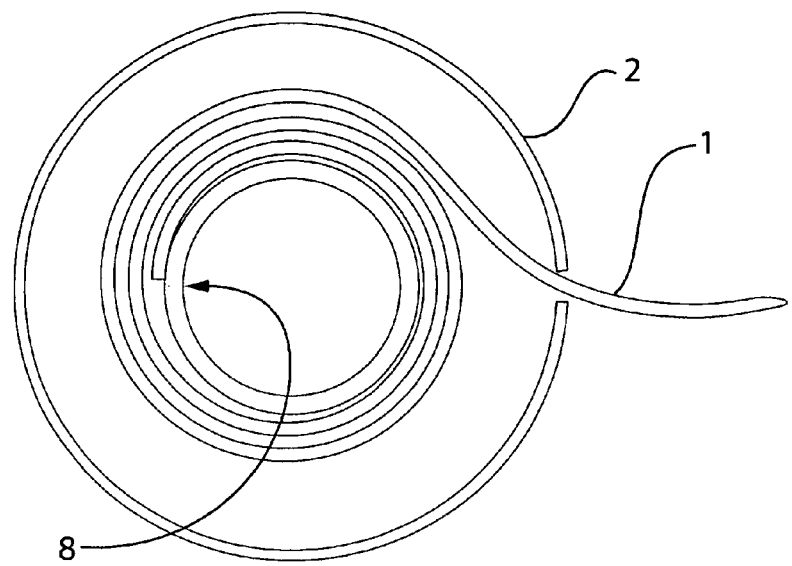
FIG. 5 is a section along 5-5 of FIG. 2 showing the roller mechanism, and rolled up test pattern within the housing.

FIG. 5 shows the test pattern rolled up within the housing 2 on spring 8.

Figure 6:
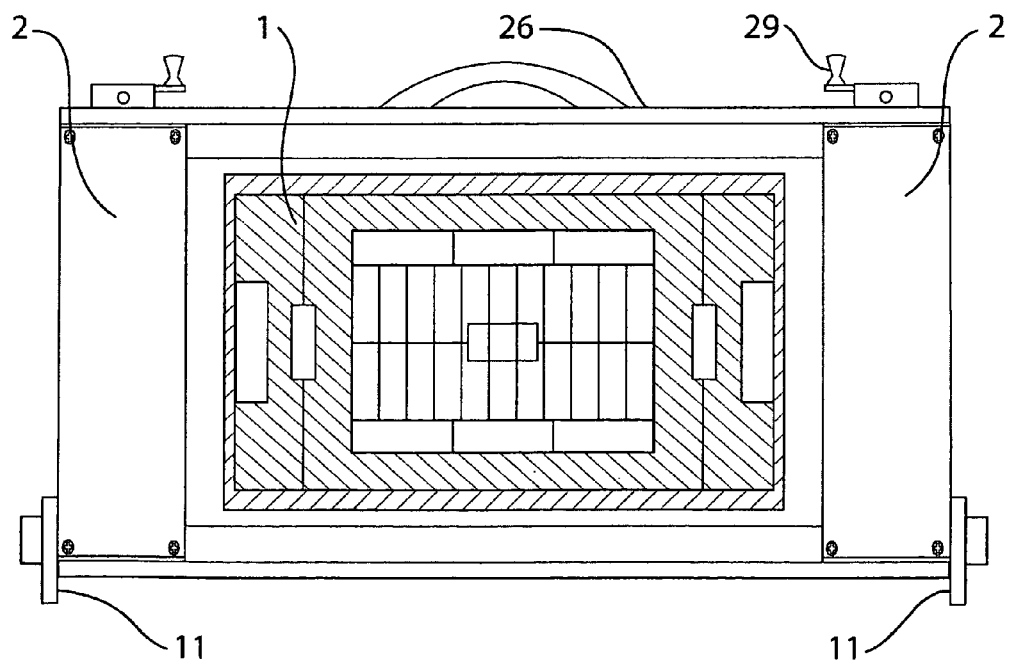
FIG. 6 is front elevation of an alternate embodiment.

FIG. 6 shows a front and plan view in which two housings 2 connected by members 26 enable a number of patterns to be stored and easily accessed for use, using winding handles 29. Optional motor drives within the pattern housings may use a planetary reduction gear system to wind charts back and forth between the housings. Adjustable feet 11, enable feet to be locked in various settings by knobs which provides leveling, forward and backwards, also tilting from side to side.

Figure 7:
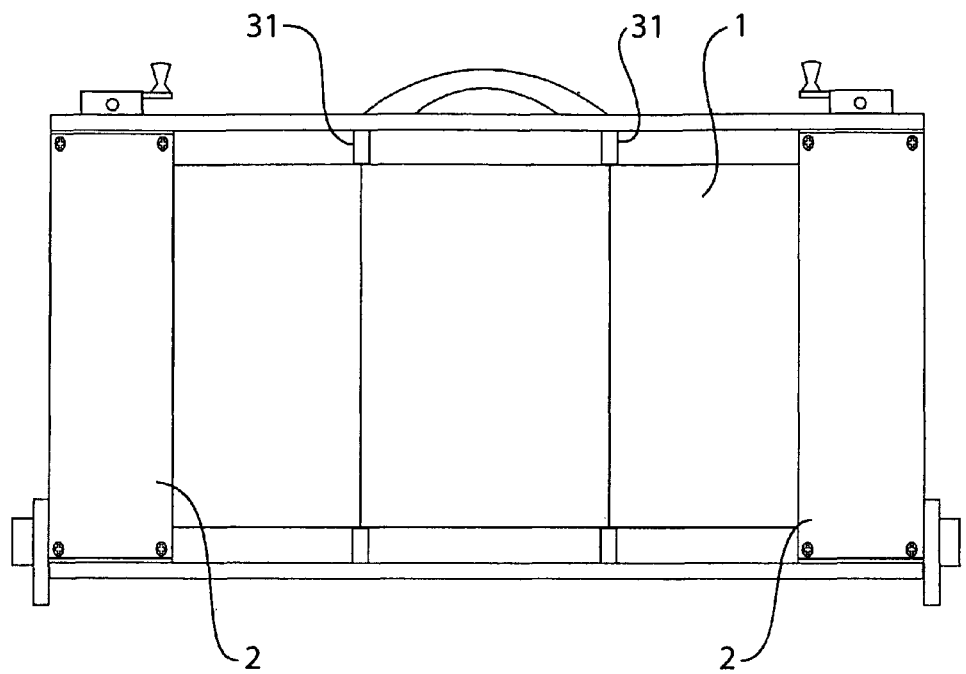
FIG. 7 is a front elevation, showing a further device in use with a test pattern(s)
Figure 8:
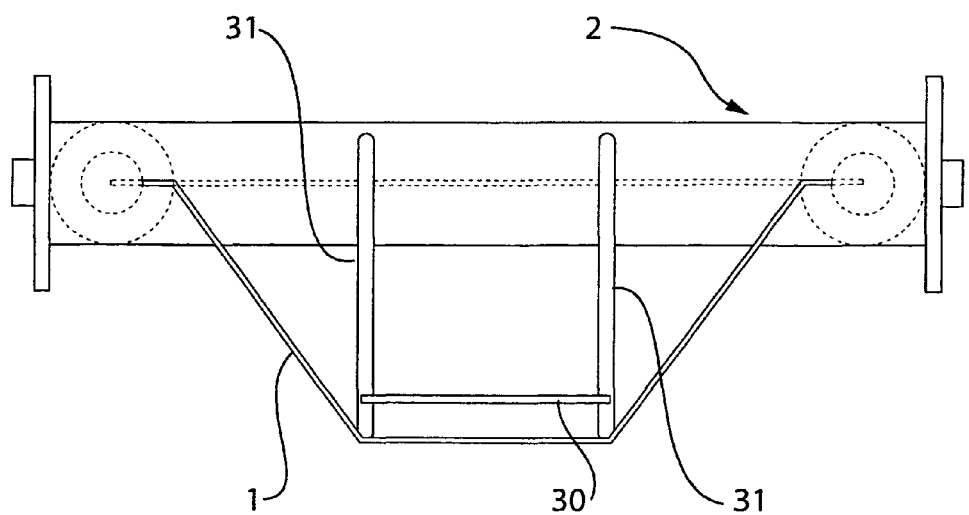
FIG. 8 is a top plan view of the embodiment of FIG. 7.

FIGS. 7 and 8 show similar features to double housing FIG. 6 above, with the addition of angle adjusting members 31 which attach to support members and are held in correct position by spacing retainer 30. This enables a spectrophotometrically neutral section of the flexible chart to be pushed forward so that the center section remains at 90° normal to the camera while the two sides of the flexible chart are adjusted to 45° and 135° respectively.

Figure 9:
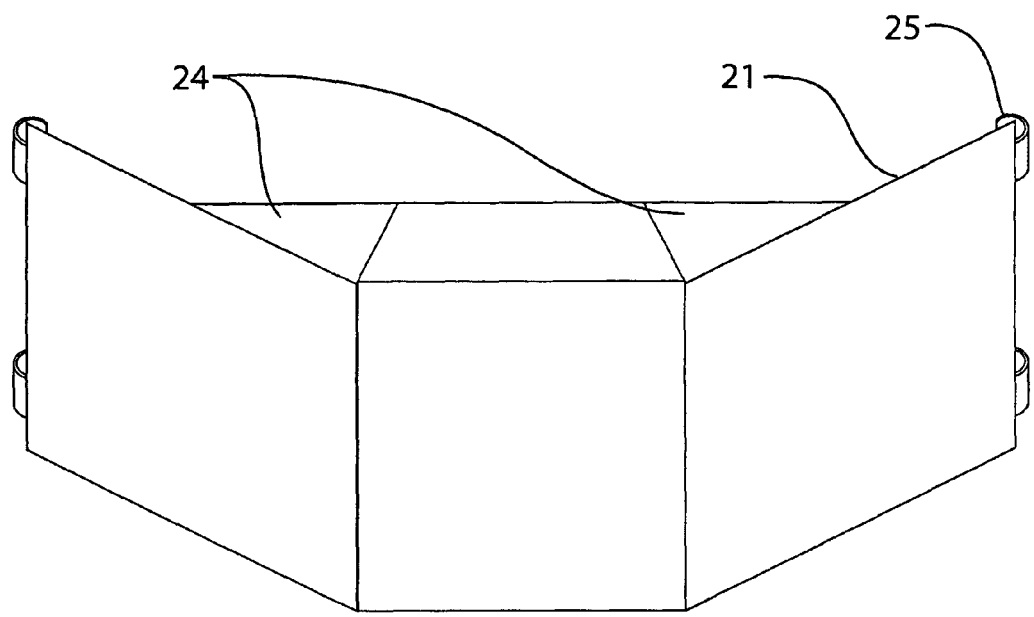
FIG. 9 is a schematic perspective illustration of a further embodiment.
Figure 10:
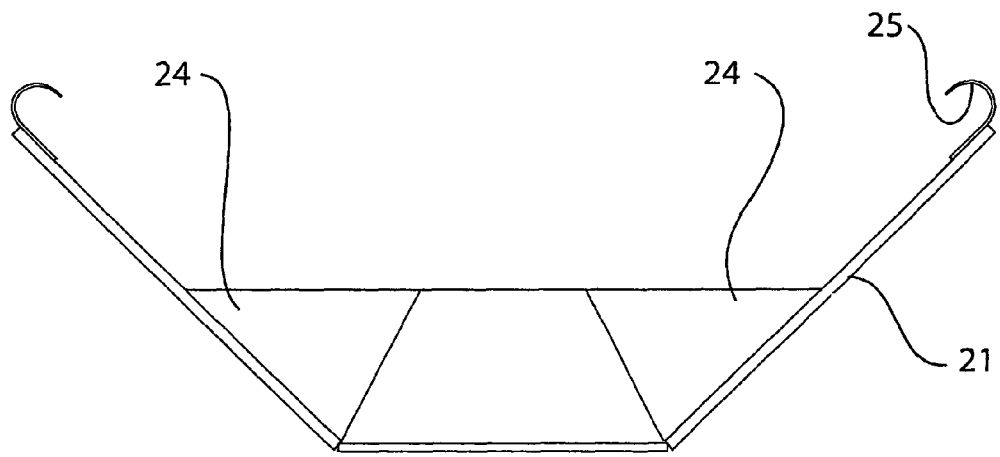
FIG. 10 is the top plan view of the embodiment of FIG. 9.

FIGS. 9 and 10 show a perspective front view of a folding member 21, the front of which is covered with a spectrophotometrically neutral reflective surface, wherein the folding member may be opened and locked using angle setting panels 24 to provide three flat reference surfaces at 45°, 90° and 135°, relative to the camera. The reflected light from the neutral reflective surfaces enable the lighting contrast ratio from the three surfaces of the chart to be readily measured by monitoring instrumentation attached to a camera. The folding member can be used free standing or attached to a flat or flexible chart using clips or other devices such as snap poppers or Velcro.

FIGS. 11 & 12 show devices for providing an aperture 40 with a black interior for reducing effects of lighting glare on the test pattern and show plan and side views of a flexible black curved member 42 located behind the aperture in pattern. To provide ease of installation and removal the curved member is clipped on to aperture in pattern, or otherwise attached by well known means such as hook and loop fabric to pattern behind aperture. To prevent light entering from the rear of pattern flexible flap members may be used to cover the open ends of the cavity produced by curved member.

FIG. 13 show a frontal view wherein the housing 2 is held horizontal pattern 1 being revealed by pulling member 4. A similar but larger design can be used horizontally, when the pattern is pulled from the housing it may be locked in place using locking device. By placing the housing on the edge of a flat surface the pattern(s) may be hung for use, alternatively using threaded fitting, the housing may be attached to a tripod or other threaded support, thus enabling a camera operator to use the device single handedly. On release of locking device the pattern retracts back into housing.

The invention may also be used in security work. In this field the invention has two primary uses, both prior to, and subsequent to a security incident. Because security cameras are normally inexpensive, their image quality is typically less than optimal and further degrades with age.

Prior to a security incident the invention is used in the testing, selection and maintenance of cameras.

Subsequent to a security incident, the invention is used as an aid in identifying individuals recorded by a security camera. In security applications, the test patterns used in this invention include colour, grayscale and resolution information, measurement scales, both vertical and horizontal, also skin tone reference patches. These are used, for example, when a person of interest, possibly a suspected terrorist or criminal has been recorded by a security camera. By positioning a test pattern according to the invention at the same location and position as the suspect and recording the image from the same camera under similar conditions, split screen side by side comparison can be made thus providing valuable data as to the person's height, head size, PD (pupillary distance between eyes) and skin colour.

The invention thus provides a system and method for storing, transporting, and displaying test patterns used in the alignment of electronic imaging devices, such as still and motion imaging cameras, for example, digital still, television, security and digital cinema cameras. Test patterns, which can include colour patches, gray scales, resolution and other test images used in the adjustment of a camera or the subsequent modification or comparison of images from a camera, are stored in a housing from which one or more patterns may be rapidly accessed. An operator withdraws one or more patterns from the housing, then focuses on the pattern image and adjusts a camera for optimum reproduction. When adjustments are complete the test pattern(s) is retracted into the housing. An alternative use is to record image data from the test pattern(s) and later, by means well known in the industry, it is possible to modify the image quality using the electronic data from the recorded test pattern. Similarly, the characteristics of images shot at different locations may be matched using this technique.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A portable, self contained, deployable test pattern display, for use in optimising imaging quality, comprising;
   a portable protective display housing;
   a test pattern incorporating imaging information and contained within said housing, and being deployable from and replaceable in said housing;
   a retraction device connected to said test pattern for replacing said test pattern within said housing;
   an internal end of the pattern being attached to a spring loaded roller within said housing,
   whereby said test pattern can be carried to a desired location, protected by said housing, and said test pattern can be deployed from said housing when required, and can then be replaced within said housing.

2. A portable, self contained, deployable test pattern display, for use in optimising imaging quality as claimed in claim 1 and wherein an external end of the pattern is attached to a rod member external to the housing, enabling the pattern to be withdrawn from the housing.

3. A portable, self contained, deployable test pattern display, for use in optimising imaging quality as claimed in claim 1 including a holding device for holding the test pattern in its deployed position.

4. A portable, self contained, deployable test pattern display, for use in optimising imaging quality as claimed in claim 3 wherein the holding devices includes flexible elements attached to said test pattern and attachable to the exterior of said housing.

5. A portable, self contained, deployable test pattern display, for use in optimising imaging quality as claimed in claim 3 wherein said holding device includes at least one support member attachable between said test pattern and said housing.

6. A portable, self contained, deployable test pattern display, for use in optimising imaging quality as claimed in claim 1 wherein said test pattern includes a central planar portion and at least one side portion at an angle to said central planar portion.

7. A portable, self contained, deployable test pattern display, for use in optimising imaging quality as claimed in claim 1 including legs on said housing by which it can be supported at a desired location.

8. A portable, self contained, deployable test pattern display, for use in optimising imaging quality as claimed in claim 7 wherein said legs are adjustable to position said housing and test pattern in desired orientations.

9. A portable, self contained, deployable test pattern display, for use in optimising imaging quality as claimed in claim 1 including a second housing, and said test pattern being partially stored in one said housing and partially stored in the other.

10. A portable, self contained, deployable test pattern display, for use in optimising imaging quality as claimed in claim 1 and including power operated means for extending and retracting said test pattern from and into said housing.

11. A portable, self contained, deployable test pattern display, for use in optimising imaging quality as claimed in claim 1 and wherein said test pattern includes an aperture, and black interior surface within said aperture, and a test pattern portion being adapted to be placed within said aperture to reduce lighting effects on said test pattern portion.

12. A portable, self contained, deployable test pattern display, for use in optimising imaging quality as claimed in claim 1 and wherein said test pattern comprises patches displaying primary colours of the test pattern, Red, Green, Blue, Cyan, Magenta and Yellow, which define RGB level combinations which are preferably in the region of 560 and 280 mV (80 and 40 IRE units), plus or minus 5 mV.

13. A portable, self contained, deployable test pattern display, for use in optimising imaging quality as claimed in claim 12 and wherein said test pattern Red patch produces 560 mV (80 IRE) for the Red channel and 280 mV (40 IRE) each for the Blue and Green, and wherein yellow patch produces 560 mV (80 IRE) for the Red and Green channels and 280 mV (40 IRE) for the Blue, and wherein the other said patches reproduce at their similar respective levels.

\* \* \* \* \*